T. SHARP.
CAR WHEEL.
No. 1,851. Reissued Jan. 10, 1865.
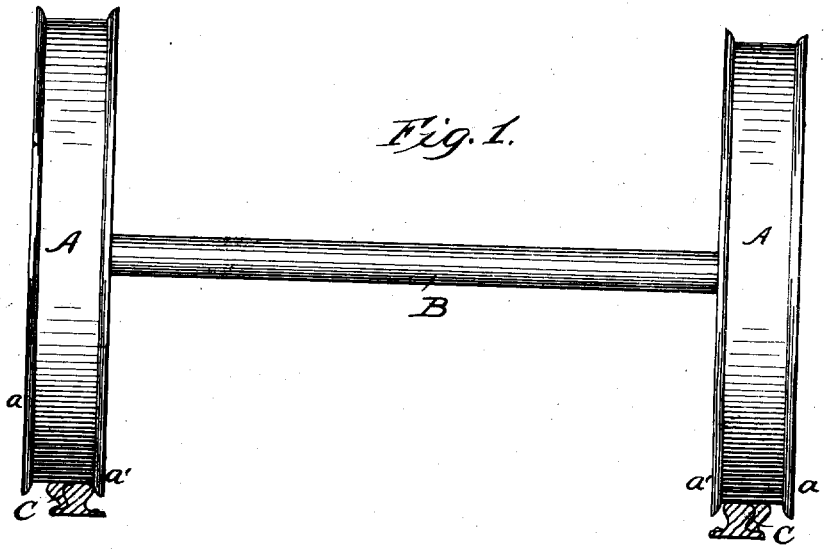
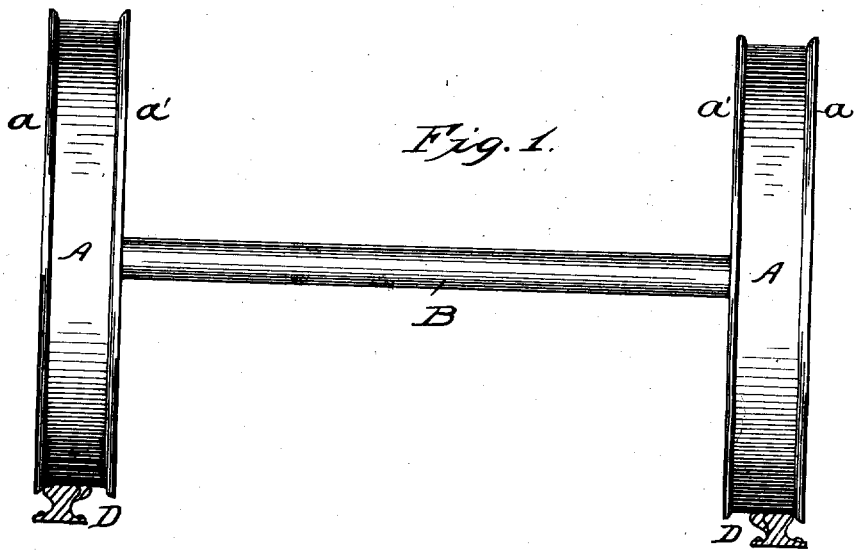

UNITED STATES PATENT OFFICE.

THOMAS SHARP, OF CHICAGO, ILLINOIS.

CAR-WHEEL.

Specification forming part of Letters Patent No. 40,123, dated September 29, 1863; Reissued January 10, 1865, No. 1,851.

*To all whom it may concern:*

Be it known that I, THOMAS SHARP, of Chicago, in the county of Cook and State of Illinois, have invented a new and useful Improvement in Car-Wheels; and I do hereby declare that the following is a full, clear, and exact description thereof, reference being had to the accompanying drawings, and the letters and figures marked thereon, which form part of this specification.

In said drawings, which are hereunto annexed, Figure 1, represents a side view of my improved car wheel, standing upon a rail road track of the four feet eight and a half inch gage; and Fig. 2, represents a similar view thereof, when standing upon a track of the four feet ten inch gage.

The nature of my invention consists in providing the wheels of a rail road car, or locomotive with two flanges, one on the inside of the wheel as car wheels are usually constructed, and an additional flange upon the outside of said wheel, the face or tread thereof included between the said flanges, being broad enough to exceed the width of the face of the rail by a little more than three fourths of an inch.

The object of my invention is to obtain a wheel for locomotives and rail road cars, which will run both upon the narrow, or four feet eight and a half inch gage, and the four feet ten inch gage, with equal facility and safety.

To enable others skilled in the art, to understand how to construct and make use of my invention, I will proceed to describe the same with particularity.

A A, represent a pair of wheels of my invention standing upon rail road tracks of two different gages. The axle B, which connects each pair of wheels, is of such length as to cause the inner flange upon each wheel, marked *a'*, to run close against the inner side of the rails of the four feet eight and a half inch gage track; and the face of the wheels are of such breadth, between the flanges, that the outer flange, marked *a*, runs close against the outer side of the rails of the four feet ten inch gage track.

C C, in Fig. 1, and D D, in Fig. 2, represent cross sections of the different gaged tracks, showing the relative position of the wheels upon each.

I am aware that car wheels have heretofore been constructed with two flanges for the purpose of affording security and safety in preventing the cars from running off the track, by fastening upon the wheels a separate piece or ring of metal as a flange; but my improvement consists in constructing a double flanged car wheel with a broad face or tread, thereby adapting it, to tracks of different gages; and my improved wheel may be constructed of a single casting, as I prefer to do, by the employment of a wheel of a peculiar construction for which I have obtained Letters Patent; or it may be made by riveting, or otherwise fastening a separate piece upon the wheel for the outer flange.

The purpose of my invention not being additional safety or security, but to enable car wheels to be run with equal facility upon tracks of two different gages as aforesaid; it cannot be effected by simply providing the wheel with two flanges, but another important alteration in the wheel must necessarily be made, before the object of my invention can be attained—namely, the increasing of the breadth of the face or tread of the wheel, so that the inner flange shall run close against the inner side of the rails of the narrow gage, and the outer flange shall run close against the outer side of the rails of the wider gage, both the additional flange and the increased breadth of tread being essential to the accomplishment of my purpose.

What I claim as new and desire to secure by Letters Patent is—

1. I claim in the construction of a car wheel, the combination of the two flanges *a a'*, with the broad tread described, when arranged and operating with respect to the different gages herein specified substantially as delineated and set forth.

2. I claim constructing said car wheel of a single casting, in the manner and for the purposes herein set forth and described.

THOMAS SHARP.

Witnesses:

W. E. MAUS,

J. L. COBURN.

[FIRST PRINTED 1911.]